United States Patent
Qin et al.

(10) Patent No.: US 12,170,822 B2
(45) Date of Patent: Dec. 17, 2024

(54) METHOD AND APPARATUS FOR CONTROLLING VIDEO PLAYING, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Zhiwei Qin, Beijing (CN); Kun Song, Beijing (CN); Xiaokun Zhao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/433,142

(22) PCT Filed: Jan. 6, 2021

(86) PCT No.: PCT/CN2021/070412
§ 371 (c)(1),
(2) Date: Aug. 23, 2021

(87) PCT Pub. No.: WO2021/232827
PCT Pub. Date: Nov. 25, 2021

(65) Prior Publication Data
US 2023/0336826 A1    Oct. 19, 2023

(30) Foreign Application Priority Data

May 22, 2020   (CN) .......................... 202010443500.8

(51) Int. Cl.
*H04N 21/472*   (2011.01)
*G06F 3/01*   (2006.01)
(Continued)

(52) U.S. Cl.
CPC ....... *H04N 21/47217* (2013.01); *G06F 3/013* (2013.01); *G06T 19/006* (2013.01); *G06V 40/193* (2022.01); *H04N 21/4333* (2013.01)

(58) Field of Classification Search
CPC ......... H04N 21/47217; H04N 21/4333; G06V 40/193; G06F 3/013; G06T 19/006
See application file for complete search history.

(56) References Cited

U.S. PATENT DOCUMENTS

| 6,152,563 A | 11/2000 | Hutshinson et al. |
| 8,786,953 B2 | 7/2014 | Wheeler et al. |

(Continued)

FOREIGN PATENT DOCUMENTS

| CA | 2915020 A1 | 6/2017 |
| CN | 103324283 A | 9/2013 |

(Continued)

OTHER PUBLICATIONS

Notice of Reasons for Refusal dated Oct. 18, 2022, for Application No. JP2021-549408 (18 pages).

(Continued)

*Primary Examiner* — Girumsew Wendmagegn
(74) *Attorney, Agent, or Firm* — KDW Firm PLLC (57) ABSTRACT

Provided are a method and apparatus for controlling video playing, an electronic device and a storage medium. The solution is as follows: in response to at least one video being playing or paused on a display screen, acquiring a current face image of a user in front of the display screen; parsing the current face image by using an augmented reality-based gaze tracking method to determine a current visual focus of the user on the display screen; and controlling, according to the current visual focus, the at least one video to continue playing or be paused on the display screen.

10 Claims, 5 Drawing Sheets

(51) Int. Cl.
  *G06T 19/00* (2011.01)
  *G06V 40/18* (2022.01)
  *H04N 21/433* (2011.01)

(56) References Cited

U.S. PATENT DOCUMENTS

| | | | |
|---|---|---|---|
| 10,349,135 | B2 | 7/2019 | Vazquez |
| 2006/0256133 | A1 | 11/2006 | Rosenberg |
| 2010/0079508 | A1 | 4/2010 | Hodge et al. |
| 2013/0128364 | A1 | 5/2013 | Wheeler et al. |
| 2013/0278800 | A1* | 10/2013 | Liu .................. G02B 27/027 348/240.1 |
| 2014/0267021 | A1 | 9/2014 | Lee et al. |
| 2015/0036999 | A1* | 2/2015 | Batur ................ H04N 21/4325 386/230 |
| 2015/0143293 | A1* | 5/2015 | George-Svahn .... G06F 3/04883 715/822 |
| 2016/0328015 | A1 | 11/2016 | Ha et al. |
| 2018/0077455 | A1 | 3/2018 | Abou Mahmoud et al. |
| 2018/0173319 | A1 | 6/2018 | Marggraff et al. |
| 2020/0125165 | A1 | 4/2020 | Pace et al. |
| 2020/0225747 | A1* | 7/2020 | Bar-Zeev .............. G06T 19/006 |

FOREIGN PATENT DOCUMENTS

| | | | |
|---|---|---|---|
| CN | 103699210 | A | 4/2014 |
| CN | 105227982 | A | 1/2016 |
| CN | 105229570 | A | 1/2016 |
| CN | 106095111 | A | 11/2016 |
| CN | 106325519 | A | 1/2017 |
| CN | 106604130 | A | 4/2017 |
| CN | 106792036 | A | 5/2017 |
| CN | 107396170 | A | 11/2017 |
| CN | 108388339 | A | 8/2018 |
| CN | 109558008 | A | 4/2019 |
| CN | 110825228 | A | 2/2020 |
| CN | 111052042 | A | 4/2020 |
| CN | 111586459 | A | 8/2020 |
| EP | 1209553 | A1 | 5/2002 |
| JP | H1185452 | A | 3/1999 |
| KR | 20110017236 | A | 2/2011 |
| KR | 20120045392 | A | 5/2012 |
| WO | 2013168173 | A1 | 11/2013 |
| WO | 2019067901 | A2 | 4/2019 |
| WO | 2019067902 | A1 | 4/2019 |

OTHER PUBLICATIONS

Request for the Submission of an Opinion dated Oct. 19, 2022, for Application No. KR10-2021-7026694 (nine (9) pages).
International Search Report for the International Patent Application No. PCT/CN2021/070412, mailed Mar. 26, 2021, 3 pages [translation included].
Search Report for the Chinese Patent Application No. 2020104435008, mailed Mar. 1, 2021, 2 pages.
Office Action for the Chinese Patent Application No. 2020104435008, mailed Mar. 1, 2021, 9 pages [translation included].
Supplementary European Search Report for Application No. EP21751951.1, dated May 31, 2022 (11 pages).
Second Office Action for Korean Application No. 10-2021-7026694, mailed Apr. 27, 2023, 11 pages.

* cited by examiner

METHOD AND APPARATUS FOR CONTROLLING VIDEO PLAYING, ELECTRONIC DEVICE AND STORAGE MEDIUM

CROSS-REFERENCES TO RELATED APPLICATION

This is a National stage application, filed under 37 U.S.C. 371, of International Patent Application NO. PCT/CN2021/070412, filed on Jan. 6, 2021, which is based on and claims priority to a Chinese patent application No. CN202010443500.8 filed with the CNIPA on May 22, 2020, disclosure of which is incorporated herein by reference in its entirety.

TECHNICAL FIELD

The present disclosure relates to the technical field of computers, for example, to augmented reality technologies, and in particular to a method and apparatus for controlling video playing, an electronic device and a storage medium.

BACKGROUND

With the rapid advancement of 5G technologies and the emergence of rich media such as short videos, the ways of accessing information for netizens have become more diversified, and there is a growing demand for more intelligent access and processing of information. For example, since the release of application (app) Haokan Video, users have been increasingly active in the app and will have higher and higher requirements for experience when viewing a video.

However, in practice, it is found that in the process of playing a video on a mobile phone, a tablet computer and other smart devices, when the user needs to pause the video currently playing on the smart device, the user needs to click the pause button on the screen of the smart device by hand, and when the user needs the video on the smart device to be played again, the user has to click the play button on the screen of the smart device with a finger. Apparently, this way of controlling video playing by clicking on the screen with a finger reduces not only the convenience of video playing but also the efficiency of controlling video playing.

In existing methods for controlling video playing, only eye movements including opening and closing of eyes, rotation directions of eyes and the like can be analyzed through recognition algorithms, and it is impossible to more accurately control video playing through the preceding eye movements.

SUMMARY

The present disclosure provides a method and apparatus for controlling video playing, a device and a storage medium so that video playing can be more accurately controlled through eyes, it is more convenient for a user to operate and the viewing experience of the user can be effectively improved.

In an aspect, the present disclosure provides a method for controlling video playing. The method includes the steps described below.

In response to at least one video being playing or paused on a display screen, a current face image of a user in front of the display screen is acquired.

The current face image is parsed by using an augmented reality-based gaze tracking method to determine a current visual focus of the user on the display screen.

The at least one video is controlled according to the current visual focus to continue playing or be paused on the display screen.

In an aspect, the present disclosure provides an apparatus for controlling video playing. The apparatus includes an acquisition module, a parsing module and a control module.

The acquisition module is configured to: in response to at least one video being playing or paused on a display screen, acquire a current face image of a user in front of the display screen.

The parsing module is configured to parse the current face image by using an augmented reality-based gaze tracking method to determine a current visual focus of the user on the display screen.

The control module is configured to control according to the current visual focus the at least one video to continue playing or be paused on the display screen.

In an aspect, the present disclosure provides an electronic device. The electronic device includes one or more processors and a memory.

The memory is configured to store one or more programs.

The one or more programs are executed by the one or more processors to cause the one or more processors to implement the method for controlling video playing of any embodiment of the present disclosure.

In an aspect, the present disclosure provides a storage medium storing a computer program. The program, when executed by a processor, implements the method for controlling video playing of any embodiment of the present disclosure.

BRIEF DESCRIPTION OF DRAWINGS

The drawings are intended to provide a better understanding of the present solution and not to limit the present disclosure. In the drawings.

DETAILED DESCRIPTION

Example embodiments of the present disclosure, including details of embodiments of the present disclosure, are described hereinafter in conjunction with the drawings to facilitate understanding. The example embodiments are illustrative only. Therefore, it is to be understood by those of ordinary skill in the art that various changes and modifications may be made to the embodiments described herein without departing from the scope and spirit of the present disclosure. Similarly, description of well-known functions and constructions is omitted hereinafter for clarity and conciseness.

Embodiment One

Figure 1:
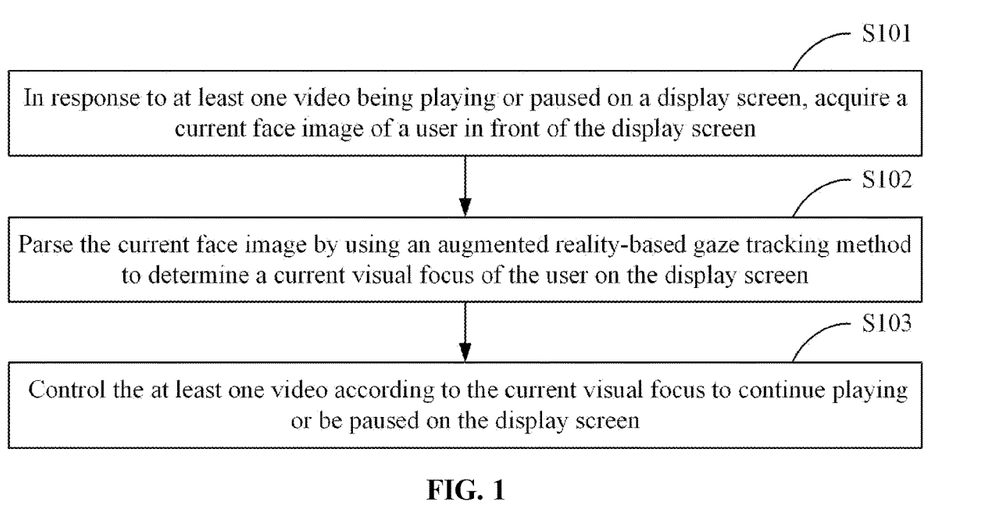
FIG. 1 is a flowchart of a method for controlling video playing according to an embodiment of the present disclosure.

FIG. 1 is a flowchart of a method for controlling video playing according to an embodiment of the present disclosure. The method may be executed by an apparatus for controlling video playing or an electronic device. The apparatus or the electronic device may be implemented as software and/or hardware. The apparatus or the electronic device may be integrated in any smart device having a network communication function. As shown in FIG. 1, the method for controlling video playing may include the steps described below:

In S101, in response to at least one video being playing or paused on a display screen, a current face image of a user in front of the display screen is acquired.

In the embodiment of the present disclosure, in response to at least one video being playing or paused on the display screen, the current face image of the user in front of the display screen can be acquired by the electronic device. In an example embodiment, the electronic device may acquire the current face image of the user in front of the display screen according to a preset cycle. Specifically, the electronic device may first obtain access to the front camera and then automatically acquire the face image of the user in front of the display screen through an augmented reality (AR) engine. The AR technology is a technology that skillfully integrates virtual information with the real world and widely uses various technical means such as multimedia, three-dimensional (3D) modeling, real-time tracking and registration, intelligent interaction, and sensing. The virtual information generated by computers, such as words, images, 3D models, music and videos, are simulated and then applied to the real world. The two types of information complement each other, thus achieving the "augmentation" of the real world.

In S102, the current face image is parsed by using an augmented reality-based gaze tracking method to determine a current visual focus of the user on the display screen.

In the embodiment of the present disclosure, the electronic device can parse the current face image by using the augmented reality-based gaze tracking method to determine the current visual focus of the user on the display screen. Specifically, the augmented reality-based gaze tracking method may be an ARkit gaze tracking method.

In S103, the at least one video is controlled according to the current visual focus to continue playing or be paused on the display screen.

In the embodiment of the present disclosure, the electronic device can control according to the current visual focus the at least one video to continue playing or be paused on the display screen. Specifically, in response to detecting that the user blinks continuously for N times within a preset time period, the electronic device can determine a video where the current visual focus is located according to the current visual focus of the user on the display screen. N is a natural number greater than 1. In response to the video where the current visual focus is located being playing on the display screen, the electronic device can control the video where the current visual focus is located to be paused on the display screen: or in response to the video where the current visual focus is located being paused on the display screen, the electronic device can control the video where the current visual focus is located to continue playing on the display screen.

It is to be noted that switching between a plurality of videos can be achieved through the preceding steps S101 to S103. For example, assuming that three videos, that is video 1, video 2 and video 3, exist on the display screen, video 1 and video 2 are paused and video 3 is playing, the electronic device can first acquire the current face image of the user in front of the display screen and then parse the current face image by using the augmented reality-based gaze tracking method to determine the current visual focus of the user on the display screen. Assuming that the video where the current visual focus is located is video 3, the electronic device can control video 3 to continue playing and control video 1 and video 2 to be paused. Then, the electronic device can also continue to acquire a current face image of the user in front of the display screen and then parse the current face image by using the augmented reality-based gaze tracking method to determine the current visual focus of the user on the display screen. Assuming that the video where the current visual focus is located is video 2, the electronic device can control video 2 to continue playing and control video 1 and video 3 to be paused, thereby achieving the switching from video 3 to video 2.

According to the method for controlling video playing provided in the embodiment of the present disclosure, in response to at least one video being playing or paused on the display screen, the electronic device can acquire a current face image of the user in front of the display screen, parse the current face image by using the augmented reality-based gaze tracking method to determine the current visual focus of the user on the display screen, and then control according to the current visual focus the at least one video to continue playing or be paused on the display screen. That is, according to the present disclosure, a current face image of the user in front of the display screen can be acquired so that video playing can be accurately controlled through eyes. In existing methods for controlling video playing, only eye movements including opening and closing of eyes, rotation directions of eyes and the like can be analyzed through recognition algorithms, and it is impossible to more accurately control video playing through the preceding eye movements.

According to the present disclosure, the current face image is parsed by using the augmented reality-based gaze tracking method to determine the current visual focus of the user on the display screen: such technical means overcomes the technical problem that video playing cannot be accurately controlled through eye movements in the existing art. According to the technical solution of the present disclosure, video playing can be more accurately controlled through eyes, which is more convenient for a user to operate, thus effectively improving the viewing experience of the user. Moreover, the technical solution of the embodiment of the present disclosure is simple and convenient to implement, convenient to popularize and wider in application range.

Embodiment Two

Figure 2:
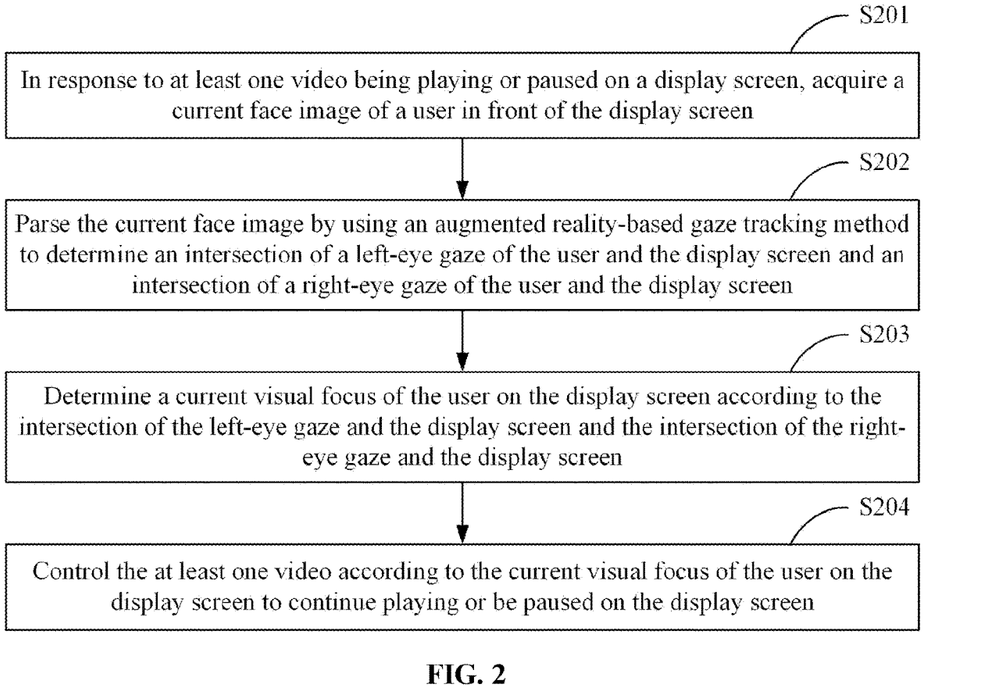
FIG. 2 is a flowchart of a method for controlling video playing according to an embodiment of the present disclosure.

FIG. 2 is a flowchart of a method for controlling video playing according to an embodiment of the present disclosure. This embodiment provides an example solution based on the preceding embodiment. As shown in FIG. 2, the method for controlling video playing may include the steps described below:

In S101, in response to at least one video being playing or paused on a display screen, a current face image of a user in front of the display screen is acquired.

In S202, the current face image is parsed by using an augmented reality-based gaze tracking method to determine an intersection of a left-eye gaze of the user and the display screen and an intersection of a right-eye gaze of the user and the display screen.

In the embodiment of the present disclosure, the electronic device can parse the current face image by using the augmented reality-based gaze tracking method to determine an intersection of a left-eye gaze of the user and the display screen and an intersection of a right-eye gaze of the user and the display screen. Specifically, the electronic device can determine a spatial position of the left-eye gaze and a spatial position of the right-eye gaze through a Left Transform model and a Right Transform model corresponding to the user and determine the intersection of the left-eye gaze and the display screen and the intersection of the right-eye gaze and the display screen according to the spatial position of the left-eye gaze, the spatial position of the right-eye gaze and a pre-determined spatial position of the display screen. According to the present disclosure, the intersection of the left-eye gaze and the display screen and the intersection of the right-eye gaze and the display screen are determined first and then used for accurately determining the current visual focus of the user on the display screen. In this manner, the video can be accurately controlled to continue playing or be paused.

Figure 3:
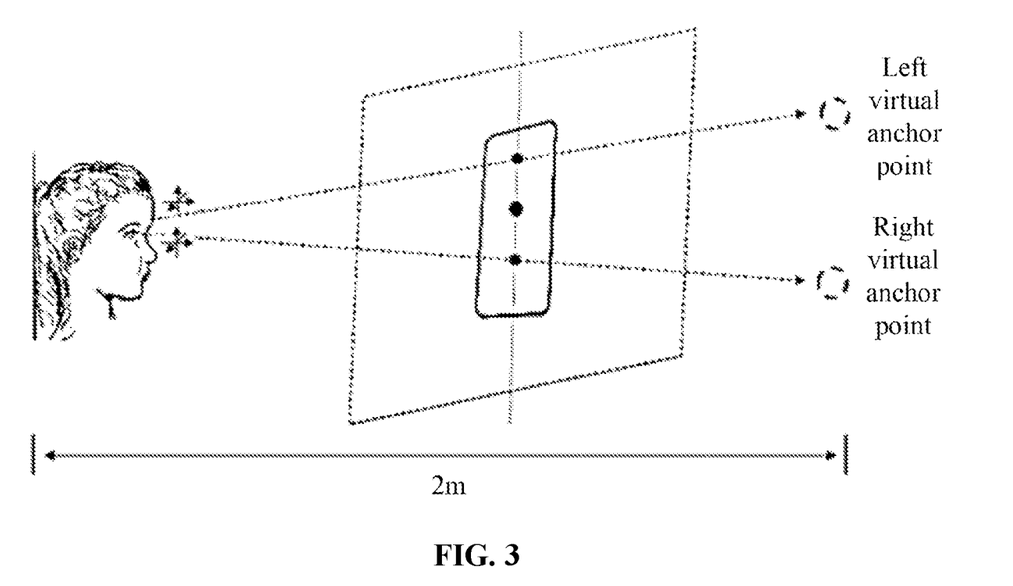
FIG. 3 is a schematic diagram of implementation of a gaze tracking technology according to an embodiment of the present disclosure.

FIG. 3 is a schematic diagram of implementation of a gaze tracking technology according to embodiment two of the present disclosure. As shown in FIG. 3, the electronic device can first add, in a three-dimensional space, a right-eye node and a left-eye node of the user, a left virtual anchor point corresponding to the left-eye node and a right virtual anchor point corresponding to the right-eye node, then determine the spatial position of the left-eye gaze according to a spatial position of the left-eye node and a spatial position of the left virtual anchor point, and determine the spatial position of the right-eye gaze according to a spatial position of the right-eye node and a spatial position of the right virtual anchor point. The left-eye gaze of the user refers to a connecting line between the left-eye node of the user and the left virtual anchor point, and the right-eye gaze of the user refers to a connecting line between the right-eye node of the user and the right virtual anchor point. The spatial position of the left-eye node may be denoted by $(x_l, y_l, z_l)$, the spatial position of the left virtual anchor point may be denoted by $(x'_l, y'_l, z'_l)$, the spatial position of the right-eye node may be denoted by $(x_r, y_r, z_r)$, and the spatial position of the right virtual anchor point may be denoted by $(x'_r, y'_r, z'_r)$. In an example embodiment, the left-eye node of the user may be the pupil of the left eye of the user, and the right-eye node of the user may be the pupil of the right eye of the user. According to the present disclosure, the spatial position of the left-eye node, the spatial position of the left virtual anchor point, the spatial position of the right-eye node and the spatial position of the right virtual anchor point are first determined so that the left-eye node and the left virtual anchor point can be connected to obtain the spatial position of the left-eye gaze of the user and the right-eye node and the right virtual anchor point can be connected to obtain the spatial position of the right-eye gaze of the user: in this manner, the intersection of the left-eye gaze and the display screen and the intersection of the right-eye gaze and the display screen can be accurately determined.

In the embodiment of the present disclosure, the distance between the face of the user and a virtual panel may be set in advance, for example, the distance between the face of the user and the virtual panel may be set to 2 meters.

In S203, a current visual focus of the user on the display screen is determined according to the intersection of the left-eye gaze and the display screen and the intersection of the right-eye gaze and the display screen.

In the embodiment of the present disclosure, the electronic device can determine the current visual focus of the user on the display screen according to the intersection of the left-eye gaze and the display screen and the intersection of the right-eye gaze and the display screen. Specifically, the electronic device can use the midpoint between the intersection of the left-eye gaze and the display screen and the intersection of the right-eye gaze and the display screen as the current visual focus of the user on the display screen. Assuming that the spatial position of the intersection of the left-eye gaze and the display screen is $(x_{lm}, y_{lm}, z_{lm})$ and the spatial position of the intersection of the right-eye gaze and the display screen is $(x_{rm}, y_{rm}, z_{rm})$, the spatial position of the current visual focus of the user on the display screen is $$\left(\frac{x_{lm} + x_{rm}}{2}, \frac{y_{lm} + y_{rm}}{2}, \frac{z_{lm} + z_{rm}}{2}\right).$$

In S204, the at least one video is controlled according to the current visual focus of the user on the display screen to continue playing or be paused on the display screen.

According to the method for controlling video playing provided in the embodiment of the present disclosure, in response to at least one video being playing or paused on the display screen, the electronic device can acquire a current face image of the user in front of the display screen, parse the current face image by using the augmented reality-based gaze tracking method to determine the current visual focus of the user on the display screen, and then control according to the current visual focus the at least one video to continue playing or be paused on the display screen. That is, according to the present disclosure, a current face image of the user in front of the display screen can be acquired so that video playing can be accurately controlled through eyes. In existing methods for controlling video playing, only eye movements including opening and closing of eyes, rotation directions of eyes and the like can be analyzed through recognition algorithms, and it is impossible to more accurately control video playing through the preceding eye movements. According to the present disclosure, the current face image is parsed by using the augmented reality-based gaze tracking method to determine the current visual focus of the user on the display screen: such technical means overcomes the technical problem that video playing cannot be accurately controlled through eye movements in the existing art. According to the technical solution of the present disclosure, video playing can be more accurately controlled through eyes, which is more convenient for a user to operate, thus effectively improving the viewing experience of the user. Moreover, the technical solution of the embodiment of the present disclosure is simple and convenient to implement, convenient to popularize and wider in application range.

Embodiment Three

Figure 4:
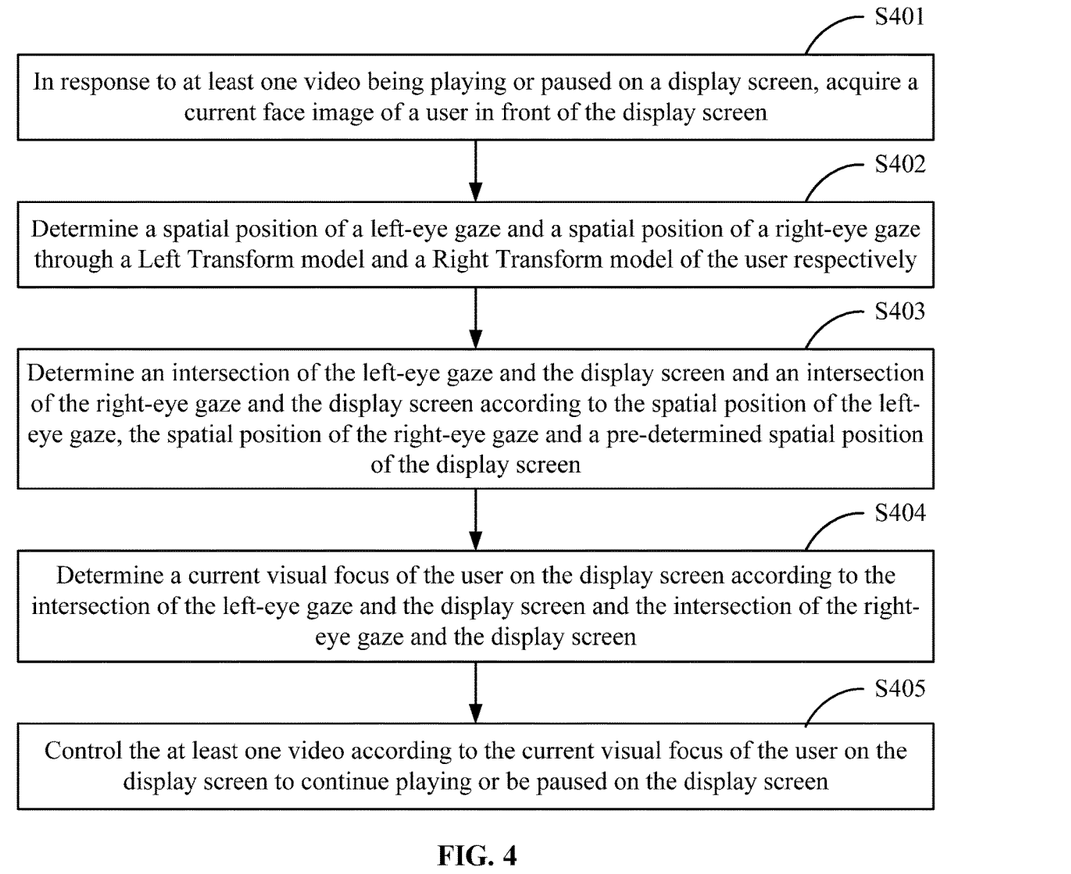
FIG. 4 is a flowchart of a method for controlling video playing according to an embodiment of the present disclosure.

FIG. 4 is a flowchart of a method for controlling video playing according to an embodiment of the present disclosure. This embodiment provides an example solution based on the preceding embodiment. As shown in FIG. 4, the method for controlling video playing may include the steps described below:

In S401, in response to at least one video being playing or paused on a display screen, a current face image of a user in front of the display screen is acquired.

Figure 5:
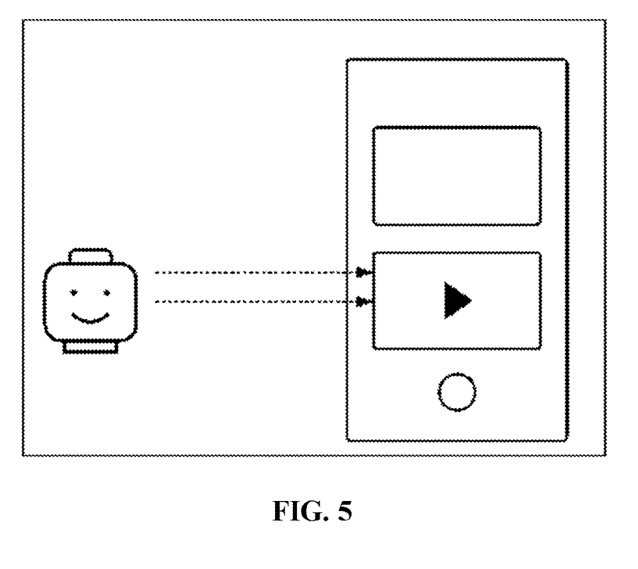
FIG. 5 is a functional diagram of an eye tracking control video playing technology according to an embodiment of the present disclosure.

FIG. 5 is a functional diagram of an eye tracking control video playing technology according to an embodiment of the present disclosure. As shown in FIG. 5, the electronic device may first obtain access to the front camera and then automatically acquire a current face image of a user in front of the display screen through an AR engine; and the electronic device performs computing on the current face image acquired to obtain the current visual focus of the user on the display screen and then automatically controls a presentation interface to scroll upwards or downwards according to the relative position of the current visual focus in the presentation interface. Specifically, in response to the current visual focus of the user on the display screen being located in an upper half region of the display screen, the electronic device can control a presentation interface on the display screen to scroll downwards: or in response to the current visual focus of the user on the display screen being located in a lower half region of the display screen, the electronic device can control a presentation interface on the display screen to scroll upwards. It can be seen that according to the present disclosure, not only the video playing but also the scrolling of the presentation interface can be controlled through eyes, thus further improving the user experience.

In S402, a spatial position of a left-eye gaze and a spatial position of a right-eye gaze are determined through a Left Transform model and a Right Transform model corresponding to the user.

In the embodiment of the present disclosure, the electronic device can determine the spatial position of the left-eye gaze and the spatial position of the right-eye gaze through the Left Transform model and the Right Transform model corresponding to the user. Specifically, the left-eye gaze of the user refers to a connecting line between the left-eye node of the user and the left virtual anchor point, and the right-eye gaze of the user refers to a connecting line between the right-eye node of the user and the right virtual anchor point. In an example embodiment, the left-eye node of the user may be the pupil of the left eye, and the right-eye node of the user may be the pupil of the right eye: the spatial position of the pupil of the left eye may be denoted by $(x_l, y_l, z_l)$, the spatial position of the left virtual anchor point may be denoted by $(x'_l, y'_l, z'_l)$, the spatial position of the pupil of the right eye may be denoted by $(x_r, y_r, z_r)$ and the spatial position of the right virtual anchor point may be denoted by $(x'_r, y'_r, z'_r)$.

In the embodiment of the present disclosure, the distance between the face of the user and a virtual panel may be set in advance, for example, the distance between the face of the user and the virtual panel may be set to 2 meters.

In S403, an intersection of the left-eye gaze and the display screen and an intersection of the right-eye gaze and the display screen are determined according to the spatial position of the left-eye gaze, the spatial position of the right-eye gaze and a pre-determined spatial position of the display screen.

In the embodiment of the present disclosure, the electronic device can determine the intersection of the left-eye gaze and the display screen and the intersection of the right-eye gaze and the display screen according to the spatial position of the left-eye gaze, the spatial position of the right-eye gaze and a pre-determined spatial position of the display screen. Specifically, the spatial position of the display screen may be represented by the plane where the display screen is located: since the left-eye gaze does not intersect the right-eye gaze on the plane where the display screen is located, the left-eye gaze and the right-eye gaze each have an intersection with the plane where the display screen is located.

In S404, a current visual focus of the user on the display screen is determined according to the intersection of the left-eye gaze and the display screen and the intersection of the right-eye gaze and the display screen.

In S405, the at least one video is controlled according to the current visual focus of the user on the display screen to continue playing or be paused on the display screen.

In the embodiment of the present disclosure, the face of one user or faces of a plurality of users may be included in the current face image acquired by the electronic device. In response to the face of merely one user being included in the current face image, the electronic device can determine the merely one user as a user who controls the at least one video to continue playing or be paused on the display screen: or in response to the faces of the plurality of users being included in the current face image, the electronic device can determine one user among the plurality of users as a user who controls the at least one video to continue playing or be paused on the display screen. For example, in response to the faces of the plurality of users being included in the current face image, the electronic device can determine the user closer to the center of the display screen as the user who controls the at least one video to continue playing or be paused on the display screen. It can be seen that according to the present disclosure, not only the image of one face but also the image of a plurality of faces can be recognized, and the technical solution provided by the present disclosure can be adopted in various viewing scenarios, thus expanding the application scope of the present disclosure.

According to the method for controlling video playing provided in the embodiment of the present disclosure, in response to at least one video being playing or paused on the display screen, the electronic device can acquire a current face image of a user in front of the display screen, parse the current face image by using the augmented reality-based gaze tracking method to determine the current visual focus of the user on the display screen, and then control according to the current visual focus the at least one video to continue playing or be paused on the display screen. That is, according to the present disclosure, a current face image of the user in front of the display screen can be acquired so that video playing can be accurately controlled through eyes. In existing methods for controlling video playing, only eye movements including opening and closing of eyes, rotation directions of eyes and the like can be analyzed through recognition algorithms, and it is impossible to more accurately control video playing through the preceding eye movements. According to the present disclosure, the current face image is parsed by using the augmented reality-based gaze tracking method to determine the current visual focus of the user on the display screen: such technical means overcomes the technical problem that video playing cannot be accurately controlled through eye movements in the existing art. According to the technical solution of the present disclosure, video playing can be more accurately controlled through eyes, which is more convenient for a user to operate, thus effectively improving the viewing experience of the user. Moreover, the technical solution of the embodiment of the present disclosure is simple and convenient to implement, convenient to popularize and wider in application range.

Embodiment Four

Figure 6:
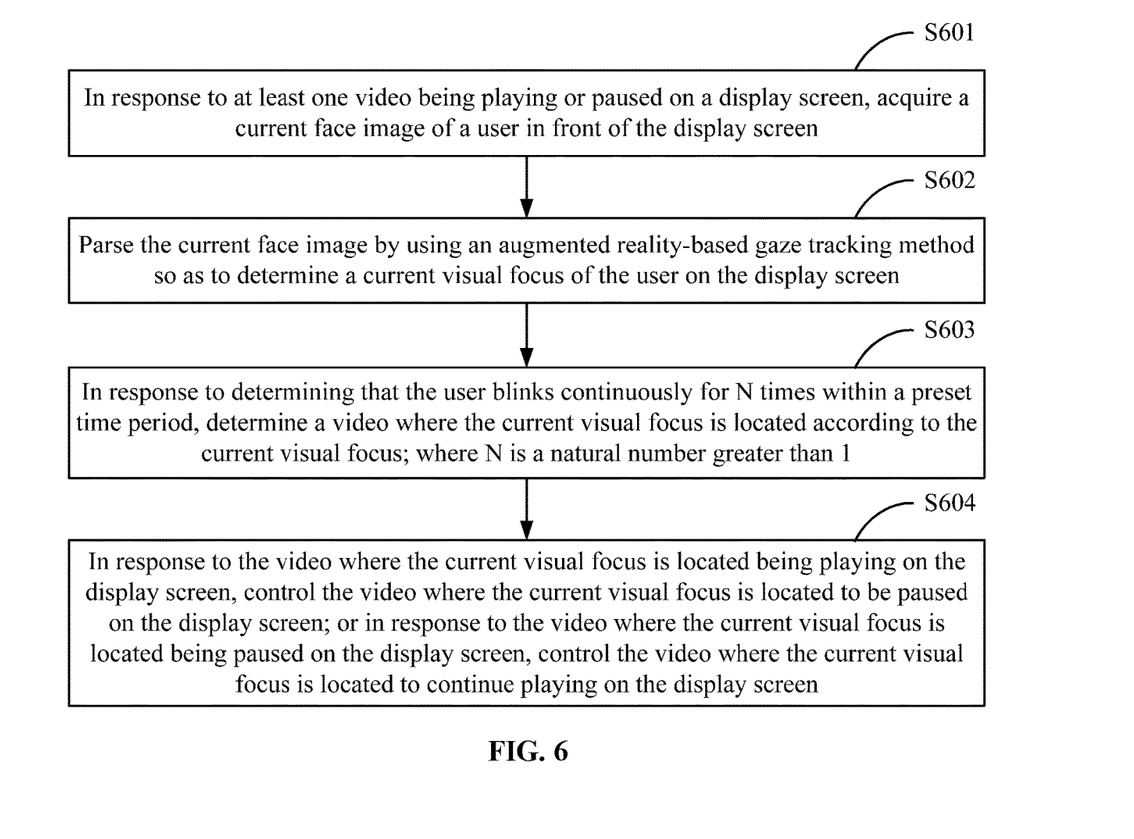
FIG. 6 is a flowchart of a method for controlling video playing according to an embodiment of the present disclosure.

FIG. 6 is a flowchart of a method for controlling video playing according to an embodiment of the present disclosure. This embodiment provides an example solution based on the preceding embodiment. As shown in FIG. 6, the method for controlling video playing may include the steps described below:

In S601, in response to at least one video being playing or paused on a display screen, a current face image of a user in front of the display screen is acquired.

In the embodiment of the present disclosure, in response to at least one video being playing or paused on the display screen, the current face image of the user in front of the display screen can be acquired by the electronic device. Specifically, the electronic device can determine the sampling rate of the face image through a sampling rate algorithm, acquire the face image of the user in front of the display screen according to the sampling rate, and use the face image acquired each time as the current face image.

In S602, the current face image is parsed by using an augmented reality-based gaze tracking method to determine a current visual focus of the user on the display screen.

In the embodiment of the present disclosure, the electronic device can also correct the determined current visual focus through a focus position correction algorithm. Each person has a different face model and a different relationship between pupil rotation amplitude and position in the eye. Therefore, according to the present disclosure, a deep learning technology is used for performing model training on the acquired current face image to obtain a more accurate position. Although different persons have different faces, a relatively accurate focus position for each person can also be achieved through the deep learning technology according to the present disclosure.

In the embodiment of the present disclosure, the electronic device may also de-noise the determined current visual focus through a focus data de-noising algorithm. The change frequency of a pupil position is very high and the abnormality of a certain piece of sampled data may lead to the jitter of the whole focus position. Therefore, a threshold may be set through the de-noising algorithm to discard the sampled data that does not meet the expectation.

In S603, in response to determination that the user blinks continuously for N times within a preset time period, a video where the current visual focus is located is determined according to the current visual focus. N is a natural number greater than 1.

In the embodiment of the present disclosure, in response to determining that the user blinks continuously for N times within a preset time period, the electronic device determines the video where the current visual focus is located according to the current visual focus of the user on the display screen. N is a natural number greater than 1. In response to the video where the current visual focus is located being playing on the display screen, the electronic device can control the video where the current visual focus is located to be paused on the display screen: or in response to the video where the current visual focus is located being paused on the display screen, the electronic device can control the video where the current visual focus is located to continue playing on the display screen. The preset time period in the present disclosure may be a relatively short time period preset, for example, the preset time period may be one second. The purpose of setting the preset time period is to determine whether the user blinks normally or issues a control instruction to prevent the electronic device from mixing up the normal blinking of the user and the issuing of the control instruction, thus avoiding affecting the normal viewing of the user. For example, when a certain video is playing on the display screen, a user blinking twice within one second indicates that the user issues an instruction of pausing the playing. When the electronic device detects that the user blinks twice within one second, it is regarded that the electronic device receives the instruction of pausing the playing issued by the user. At this time, the electronic device controls the video to be paused on the display screen. When a certain video is paused on the display screen, a user blinking twice within one second indicates that the user issues an instruction of continuing the playing. When the electronic device detects that the user blinks twice within one second, it is regarded that the electronic device receives the instruction of continuing the playing issued by the user. At this time, the electronic device controls the video to continue playing on the display screen.

In the embodiment of the present disclosure, in response to failing to determine the current visual focus by parsing the current face image, the electronic device can reduce a brightness value of the display screen by a predetermined value. Specifically, if the electronic device cannot determine the current visual focus of a user by parsing a current face image within a preset cycle, the electronic device can reduce the brightness value of the display screen by one unit value: if the electronic device cannot determine the current visual focus of the user by parsing the current face image within a plurality of preset cycles, the electronic device can reduce the brightness value of the display screen by a plurality of unit values, thus achieving the purpose of dynamic power saving.

In S604, in response to the video where the current visual focus is located being playing on the display screen, the video where the current visual focus is located is controlled to be paused on the display screen: or in response to the video where the current visual focus is located being paused on the display screen, the video where the current visual focus is located is controlled to continue playing on the display screen.

According to the method for controlling video playing provided in the embodiment of the present disclosure, in response to at least one video being playing or paused on the display screen, the electronic device can acquire a current face image of a user in front of the display screen, parse the current face image by using the augmented reality-based gaze tracking method to determine the current visual focus of the user on the display screen, and then control according to the current visual focus the at least one video to continue playing or be paused on the display screen. That is, according to the present disclosure, a current face image of the user in front of the display screen can be acquired so that video playing can be accurately controlled through eyes. In existing methods for controlling video playing, only eye movements including opening and closing of eyes, rotation directions of eyes and the like can be analyzed through recognition algorithms, and it is impossible to more accurately control video playing through the preceding eye movements. According to the present disclosure, the current face image is parsed by using the augmented reality-based gaze tracking method to determine the current visual focus of the user on the display screen: such technical means overcomes the technical problem that video playing cannot be accurately controlled through eye movements in the existing art. According to the technical solution of the present disclosure, video playing can be more accurately controlled through eyes, which is more convenient for a user to operate, thus effectively improving the viewing experience of the user. Moreover, the technical solution of the embodiment of the present disclosure is simple and convenient to implement, convenient to popularize and wider in application range.

Embodiment Five

Figure 7:
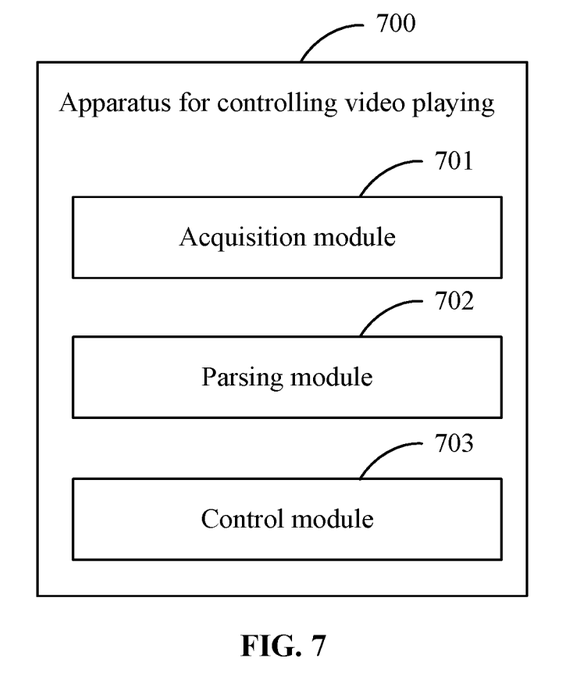
FIG. 7 is a structure diagram of an apparatus for controlling video playing according to an embodiment of the present disclosure.

FIG. 7 is a structure diagram of an apparatus for controlling video playing according to an embodiment of the present disclosure. As shown in FIG. 7, an apparatus 700 includes: an acquisition module 701, a parsing module 702 and a control module 703.

The acquisition module 701 is configured to: in response to at least one video being playing or paused on a display screen, acquire a current face image of a user in front of the display screen.

The parsing module 702 is configured to parse the current face image by using an augmented reality-based gaze tracking method to determine a current visual focus of the user on the display screen.

The control module 703 is configured to control according to the current visual focus the at least one video to continue playing or be paused on the display screen.

Further, the parsing module 702 is configured to: parse the current face image by using the augmented reality-based gaze tracking method to determine an intersection of a left-eye gaze of the user and the display screen and an intersection of a right-eye gaze of the user and the display screen; and determine the current visual focus according to the intersection of the left-eye gaze and the display screen and the intersection of the right-eye gaze and the display screen.

Further, the parsing module 702 is configured to determine a spatial position of the left-eye gaze and a spatial position of the right-eye gaze through a Left Transform model and a Right Transform model corresponding to the user; and determine the intersection of the left-eye gaze and the display screen and the intersection of the right-eye gaze and the display screen according to the spatial position of the left-eye gaze, the spatial position of the right-eye gaze and a pre-determined spatial position of the display screen.

Further, the parsing module 702 is configured to: add, in a three-dimensional space, a right-eye node and a left-eye node of the user, a left virtual anchor point corresponding to the left-eye node and a right virtual anchor point corresponding to the right-eye node: determine the spatial position of the left-eye gaze according to a spatial position of the left-eye node and a spatial position of the left virtual anchor point; and determine the spatial position of the right-eye gaze according to a spatial position of the right-eye node and a spatial position of the right virtual anchor point.

The control module 703 is further configured to: in response to a face of merely one user being included in the current face image, determine the merely one user as a user who controls the at least one video to continue playing or be paused on the display screen: or in response to faces of a plurality of users being included in the current face image, determine one user among the plurality of users as a user who controls the at least one video to continue playing or be paused on the display screen.

Further, the control module 703 is configured to: in response to determining that the user blinks continuously for N times within a preset time period, determine a video where the current visual focus is located according to the current visual focus: wherein N is a natural number greater than 1; and in response to the video where the current visual focus is located being playing on the display screen, control the video where the current visual focus is located to be paused on the display screen: or in response to the video where the current visual focus is located being paused on the display screen, control the video where the current visual focus is located to continue playing on the display screen.

The control module 703 is further configured to: in response to the current visual focus being located in an upper half region of the display screen, control a presentation interface on the display screen to scroll downwards: or in response to the current visual focus being located in a lower half region of the display screen, control a presentation interface on the display screen to scroll upwards.

The control module 703 is further configured to: in response to failing to determine the current visual focus by parsing the current face image, reduce a brightness value of the display screen by a predetermined value.

The preceding apparatus for controlling video playing can execute the method provided by any embodiment of the present disclosure and has functional modules and beneficial effects corresponding to the executed method. For technical details not described in detail in the embodiment, reference may be made to the method for controlling video playing provided in any embodiment of the present disclosure.

Embodiment Six

According to an embodiment of the present disclosure, the present disclosure further provides an electronic device and a readable storage medium.

Figure 8:
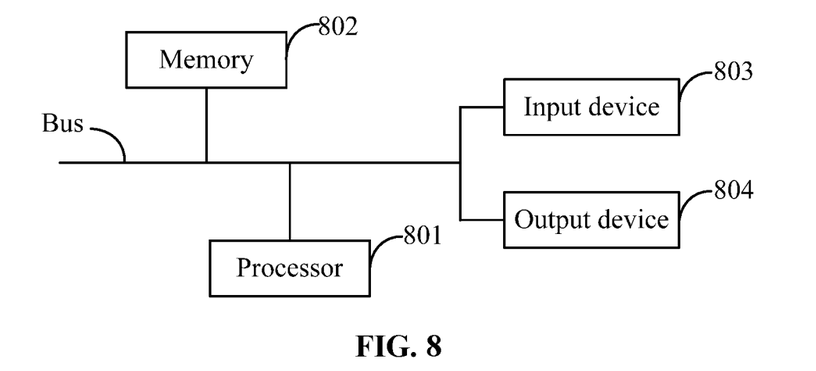
FIG. 8 is a block diagram of an electronic device for implementing a method for controlling video playing according to an embodiment of the present disclosure.

FIG. 8 is a block diagram of an electronic device for implementing a method for controlling video playing according to an embodiment of the present disclosure. Electronic devices are intended to represent various forms of digital computers, for example, laptop computers, desktop computers, worktables, personal digital assistants, servers, blade servers, mainframe computers and other applicable computers. Electronic devices may also represent various forms of mobile devices, for example, personal digital assistants, cellphones, smartphones, wearable devices and other similar computing devices. Herein the shown components, the connections and relationships between these components, and the functions of these components are illustrative only and are not intended to limit the implementation of the present disclosure as described and/or claimed herein.

As shown in FIG. 8, the electronic device includes one or more processors 801, a memory 802, and interfaces for connecting various components, including a high-speed interface and a low-speed interface. The components are interconnected to each other by different buses and may be mounted on a common mainboard or in other manners as desired. The processor may process instructions executed in the electronic device, including instructions stored in or on the memory to make graphic information of a graphical user interface (GUI) displayed on an external input/output device (for example, a display device coupled to an interface). In other embodiments, if required, multiple processors and/or multiple buses may be used with multiple memories. Similarly, multiple electronic devices may be connected, each providing some necessary operations (for example, serving as a server array, a set of blade servers or a multi-processor system). FIG. 8 shows one processor 801 by way of example.

The memory 802 is the non-transitory computer-readable storage medium provided in the present disclosure. The memory stores instructions executable by at least one processor to cause the at least one processor to perform the method for controlling video playing provided in the present disclosure. The non-transitory computer-readable storage medium of the present disclosure stores computer instructions for causing a computer to perform the method for controlling video playing provided in the present disclosure.

The memory 802 as a non-transitory computer-readable storage medium can be used for storing non-transitory software programs, non-transitory computer executable programs and modules, for example, program instructions/modules corresponding to the method for controlling video playing in the embodiment of the present disclosure (for example, the acquisition module 701, the parsing module 702 and the control module 703 shown in FIG. 7). The processor 801 executes non-transitory software programs, instructions and modules stored in the memory 802 to execute the various functional applications and data processing of a server, that is, implement the method for controlling video playing provided in the preceding method embodiments.

The memory 802 may include a program storage region and a data storage region. The program storage region may store an operating system and an application required by at least one function. The data storage region may store data created based on the use of the electronic device for performing the method for controlling video playing. Additionally, the memory 802 may include a high-speed random-access memory and a non-transitory memory, for example, at least one disk memory, a flash memory or another non-transitory solid-state memory. In some embodiments, the memory 802 may include memories disposed remote from the processor 801, and these remote memories may be connected, through a network, to the electronic device for performing the method for controlling video playing. Examples of the preceding network include, but are not limited to, the Internet, an intranet, a local area network, a mobile communication network and a combination thereof.

The electronic device for the method for controlling video playing may further include an input device 803 and an output device 804. The processor 801, the memory 802, the input device 803 and the output device 804 may be connected by a bus or in other manners. FIG. 8 uses connection by a bus as an example.

The input device 803 can receive input number or character information and generate key signal input related to user settings and function control of the electronic device for performing the method for controlling video playing. The input device 803 may be, for example, a touchscreen, a keypad, a mouse, a trackpad, a touchpad, a pointing stick, one or more mouse buttons, a trackball or a joystick. The output device 804 may be, for example, a display device, an auxiliary lighting device (for example, a light-emitting diode (LED)) or a haptic feedback device (for example, a vibration motor). The display device may include, but is not limited to, a liquid-crystal display (LCD), a light-emitting diode (LED) display or a plasma display: In some embodiments, the display device may be a touchscreen.

The various embodiments of the systems and techniques described herein may be implemented in digital electronic circuitry, integrated circuitry, an application-specific integrated circuit (ASIC), computer hardware, firmware, software and/or a combination thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input device and at least one output device and transmitting the data and instructions to the memory system, the at least one input device and the at least one output device.

These computing programs (also referred to as programs, software, software applications or codes) include machine instructions of a programmable processor. These computing programs may be implemented in a high-level procedural and/or object-oriented programming language and/or in an assembly/machine language. As used herein, the term "machine-readable medium" or "computer-readable medium" refers to any computer program product, device and/or apparatus (for example, a magnetic disk, an optical disk, a memory or a programmable logic device (PLD)) for providing machine instructions and/or data for a programmable processor, including a machine-readable medium for receiving machine instructions as machine-readable signals. The term "machine-readable signal" refers to any signal used in providing machine instructions and/or data for a programmable processor.

In order that interaction with a user is provided, the systems and techniques described herein may be implemented on a computer. The computer has a display device (for example, a cathode-ray tube (CRT) or liquid-crystal display (LCD) monitor) for displaying information to the user; and a keyboard and a pointing device (for example, a mouse or a trackball) through which the user can provide input to the computer. Other types of devices may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. The components of the system may be interconnected by any form or medium of digital data communication (for example, a communication network). Examples of the communication network include a local area network (LAN), a wide area network (WAN) and the Internet.

The computing system may include clients and servers. A client and a server are generally remote from each other and typically interact through a communication network. The relationship between the client and the server arises by virtue of computer programs running on the respective computers and having a client-server relationship to each other.

According to the technical solution provided in the embodiment of the present disclosure, in response to at least one video being playing or paused on the display screen, the electronic device can acquire a current face image of a user in front of the display screen, parse the current face image by using the augmented reality-based gaze tracking method to determine the current visual focus of the user on the display screen, and then control according to the current visual focus the at least one video to continue playing or be paused on the display screen. That is, according to the present disclosure, a current face image of the user in front of the display screen can be acquired so that video playing can be accurately controlled through eyes. In existing methods for controlling video playing, only eye movements including opening and closing of eyes, rotation directions of eyes and the like can be analyzed through recognition algorithms, and it is impossible to more accurately control video playing through the preceding eye movements. According to the present disclosure, the current face image is parsed by using the augmented reality-based gaze tracking method to determine the current visual focus of the user on the display screen: such technical means overcomes the technical problem that video playing cannot be accurately controlled through eye movements in the existing art. According to the technical solution of the present disclosure, video playing can be more accurately controlled through eyes, which is more convenient for a user to operate, thus effectively improving the viewing experience of the user.

Moreover, the technical solution of the embodiment of the present disclosure is simple and convenient to implement, convenient to popularize and wider in application range.

It is to be understood that various forms of the preceding flows may be used, with steps reordered, added or removed. For example, the steps described in the present disclosure may be executed in parallel, in sequence or in a different order as long as the desired result of the technical solution disclosed in the present disclosure is achieved. The execution sequence of these steps is not limited herein.

The scope of the present disclosure is not limited to the preceding embodiments. It is to be understood by those skilled in the art that various modifications, combinations, sub-combinations and substitutions may be made depending on design requirements and other factors.

What is claimed is:

1. A method for controlling video playing, comprising:
in response to at least one video being playing or paused on a display screen, acquiring a current face image of a user in front of the display screen;
parsing the current face image by using an augmented reality-based gaze tracking method to determine a current visual focus of the user on the display screen; and
controlling, according to the current visual focus, the at least one video to continue playing or be paused on the display screen;
wherein controlling, according to the current visual focus, the at least one video to continue playing or be paused on the display screen comprises:
in response to detecting that the user blinks continuously for N times within a preset time period, determining a video where the current visual focus is located according to the current visual focus, wherein N is a natural number greater than 1; and
in response to the video where the current visual focus is located being playing on the display screen, controlling the video where the current visual focus is located to be paused on the display screen; or in response to the video where the current visual focus is located being paused on the display screen, controlling the video where the current visual focus is located to continue playing on the display screen;
wherein parsing the current face image by using the augmented reality-based gaze tracking method to determine the current visual focus of the user on the display screen comprises:
parsing the current face image by using the augmented reality-based gaze tracking method to determine an intersection of a left-eye gaze of the user and the display screen and an intersection of a right-eye gaze of the user and the display screen; and
determining the current visual focus according to the intersection of the left-eye gaze and the display screen and the intersection of the right-eye gaze and the display screen;
wherein parsing the current face image by using the augmented reality-based gaze tracking method to determine the intersection of the left-eye gaze of the user and the display screen and the intersection of the right-eye gaze of the user and the display screen comprises:
determining a spatial position of the left-eye gaze and a spatial position of the right-eye gaze through a Left Transform model and a Right Transform model corresponding to the user; and
determining the intersection of the left-eye gaze and the display screen and the intersection of the right-eye gaze and the display screen according to the spatial position of the left-eye gaze, the spatial position of the right-eye gaze and a pre-determined spatial position of the display screen; and
wherein determining the spatial position of the left-eye gaze and the spatial position of the right-eye gaze through the Left Transform model and the Right Transform model corresponding to the user comprises:
adding, in a three-dimensional space, a right-eye node and a left-eye node of the user, a left virtual anchor point corresponding to the left-eye node and a right virtual anchor point corresponding to the right-eye node; and
determining the spatial position of the left-eye gaze according to a spatial position of the left-eye node and a spatial position of the left virtual anchor point; and determining the spatial position of the right-eye gaze according to a spatial position of the right-eye node and a spatial position of the right virtual anchor point.

2. The method of claim 1, further comprising:
in response to a face of merely one user being comprised in the current face image, determining the merely one user as a user who controls the at least one video to continue playing or be paused on the display screen; or
in response to faces of a plurality of users being comprised in the current face image, determining one user among the plurality of users as a user who controls the at least one video to continue playing or be paused on the display screen.

3. The method of claim 1, wherein after controlling the video where the current visual focus is located to be paused on the display screen, the method further comprises:
in response to the current visual focus being located in an upper half region of the display screen, controlling a presentation interface on the display screen to scroll downwards; or in response to the current visual focus being located in a lower half region of the display screen, controlling a presentation interface on the display screen to scroll upwards.

4. The method of claim 1, further comprising:
in response to failing to determine the current visual focus by parsing the current face image, reducing a brightness value of the display screen by a predetermined value.

5. An apparatus for controlling video playing, comprising an acquisition module, a parsing module and a control module, wherein
the acquisition module is configured to: in response to at least one video being playing or paused on a display screen, acquire a current face image of a user in front of the display screen;
the parsing module is configured to parse the current face image by using an augmented reality-based gaze tracking method to determine a current visual focus of the user on the display screen; and
the control module is configured to control according to the current visual focus the at least one video to continue playing or be paused on the display screen;
wherein controlling according to the current visual focus the at least one video to continue playing or be paused on the display screen comprises:
in response to detecting that the user blinks continuously for N times within a preset time period, determining a video where the current visual focus is located according to the current visual focus, wherein N is a natural number greater than 1; and
in response to the video where the current visual focus is located being playing on the display screen, controlling the video where the current visual focus is located to be paused on the display screen; or in response to the video where the current visual focus is located being paused on the display screen, controlling the video where the current visual focus is located to continue playing on the display screen;
wherein the parsing module is further configured to: parse the current face image by using the augmented reality-based gaze tracking method to determine an intersection of a left-eye gaze of the user and the display screen and an intersection of a right-eye gaze of the user and the display screen; and determine the current visual focus of the user on the display screen according to the intersection of the left-eye gaze and the display screen and the intersection of the right-eye gaze and the display screen;
wherein the parsing module is further configured to determine a spatial position of the left-eye gaze and a spatial position of the right-eye gaze through a Left Transform model and a Right Transform model corresponding to the user; and determine the intersection of the left-eye gaze and the display screen and the intersection of the right-eye gaze and the display screen according to the spatial position of the left-eye gaze, the spatial position of the right-eye gaze and a pre-determined spatial position of the display screen; and
wherein the parsing module is further configured to: add, in a three-dimensional space, a right-eye node and a left-eye node of the user, a left virtual anchor point corresponding to the left-eye node and a right virtual anchor point corresponding to the right-eye node; determine the spatial position of the left-eye gaze according to a spatial position of the left-eye node and a spatial position of the left virtual anchor point; and determine the spatial position of the right-eye gaze according to a spatial position of the right-eye node and a spatial position of the right virtual anchor point.

6. The apparatus of claim 5, wherein
the control module is further configured to: in response to a face of merely one user being comprised in the current face image, determine the merely one user as a user who controls the at least one video to continue playing or be paused on the display screen; or in response to faces of a plurality of users being comprised in the current face image, determine one user among the plurality of users as a user who controls the at least one video to continue playing or be paused on the display screen.

7. The apparatus of claim 5, wherein
the control module is further configured to: in response to the current visual focus being located in an upper half region of the display screen, control a presentation interface on the display screen to scroll downwards; or in response to the current visual focus being located in a lower half region of the display screen, control a presentation interface on the display screen to scroll upwards.

8. The apparatus of claim 5, wherein
the control module is further configured to: in response to failing to determine the current visual focus by parsing the current face image, reduce a brightness value of the display screen by a predetermined value.

9. An electronic device, comprising:
at least one processor; and
a memory communicatively connected to the at least one processor;
wherein the memory stores instructions executable by the at least one processor, and the instructions are executed by the at least one processor to cause the at least one processor to perform a method which comprises:
in response to at least one video being playing or paused on a display screen, acquiring a current face image of a user in front of the display screen;
parsing the current face image by using an augmented reality-based gaze tracking method to determine a current visual focus of the user on the display screen; and
controlling, according to the current visual focus, the at least one video to continue playing or be paused on the display screen;
wherein controlling, according to the current visual focus, the at least one video to continue playing or be paused on the display screen comprises:
in response to detecting that the user blinks continuously for N times within a preset time period, determining a video where the current visual focus is located according to the current visual focus, wherein N is a natural number greater than 1; and
in response to the video where the current visual focus is located being playing on the display screen, controlling the video where the current visual focus is located to be paused on the display screen; or in response to the video where the current visual focus is located being paused on the display screen, controlling the video where the current visual focus is located to continue playing on the display screen;
wherein parsing the current face image by using the augmented reality-based gaze tracking method to determine the current visual focus of the user on the display screen comprises:
parsing the current face image by using the augmented reality-based gaze tracking method to determine an intersection of a left-eye gaze of the user and the display screen and an intersection of a right-eye gaze of the user and the display screen; and
determining the current visual focus according to the intersection of the left-eye gaze and the display screen and the intersection of the right-eye gaze and the display screen;

wherein parsing the current face image by using the augmented reality-based gaze tracking method to determine the intersection of the left-eye gaze of the user and the display screen and the intersection of the right-eye gaze of the user and the display screen comprises:

determining a spatial position of the left-eye gaze and a spatial position of the right-eye gaze through a Left Transform model and a Right Transform model corresponding to the user; and determining the intersection of the left-eye gaze and the display screen and the intersection of the right-eye gaze and the display screen according to the spatial position of the left-eye gaze, the spatial position of the right-eye gaze and a pre-determined spatial position of the display screen; and wherein determining the spatial position of the left-eye gaze and the spatial position of the right-eye gaze through the Left Transform model and the Right Transform model corresponding to the user comprises:

adding, in a three-dimensional space, a right-eye node and a left-eye node of the user, a left virtual anchor point corresponding to the left-eye node and a right virtual anchor point corresponding to the right-eye node; and determining the spatial position of the left-eye gaze according to a spatial position of the left-eye node and a spatial position of the left virtual anchor point; and determining the spatial position of the right-eye gaze according to a spatial position of the right-eye node and a spatial position of the right virtual anchor point.

10. A non-transitory computer-readable storage medium storing computer instructions for causing a computer to perform the method of claim 1.

* * * * *